(12) United States Patent
Gemerman et al.

(10) Patent No.: US 10,503,279 B2
(45) Date of Patent: Dec. 10, 2019

(54) STYLUS WITH VISIBLE LIGHT REGIONS

(71) Applicant: Microsoft Technology Licensing, LLC, Redmond, WA (US)

(72) Inventors: Roi Gemerman, Matan (IL); Berty Albert Roza, Bat-Yam (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/428,809

(22) Filed: Feb. 9, 2017

(65) Prior Publication Data

US 2018/0095555 A1   Apr. 5, 2018

Related U.S. Application Data

(60) Provisional application No. 62/404,122, filed on Oct. 4, 2016.

(51) Int. Cl.
*G06F 3/0354* (2013.01)
*G06F 3/038* (2013.01)
*F21V 8/00* (2006.01)

(52) U.S. Cl.
CPC ......... *G06F 3/03545* (2013.01); *G02B 6/001* (2013.01); *G06F 3/0383* (2013.01)

(58) Field of Classification Search
CPC ......... G06F 3/03545; G02B 6/06; G02B 6/08; G02B 6/04; G02B 2027/011; G02B 6/0068; G02B 6/0078; G02B 6/0073; G02B 6/0028; G02B 6/0061; G09G 3/342; G09G 3/3426; G09G 3/34; G09G 3/3413; G09G 5/04

See application file for complete search history.

(56) References Cited

U.S. PATENT DOCUMENTS

| | | | |
|---|---|---|---|
| 5,053,765 A | * | 10/1991 | Sonehara ................. G02B 6/06 340/815.43 |
| 6,703,570 B1 | | 3/2004 | Russell et al. |
| 8,975,860 B2 | | 3/2015 | Lee |
| 2006/0192772 A1 | | 8/2006 | Kambayashi |
| 2008/0166175 A1 | | 7/2008 | Pittel et al. |

(Continued)

FOREIGN PATENT DOCUMENTS

| | | |
|---|---|---|
| CN | 101887315 A | 11/2010 |
| CN | 104442108 A | 3/2015 |

OTHER PUBLICATIONS

Woodford, Chris, "Digital pens", Published on: Aug. 28, 2011 Available at: http://www.explainthatstuff.com/digitalpens.html.

(Continued)

*Primary Examiner* — Sanjiv D. Patel

(57) ABSTRACT

Stylus with visible light regions techniques are described herein. In implementations, a stylus for a computing device is configured with one or more light-emitting elements configured to selectively illuminate one or more visible light regions of the stylus. Generally, the light-emitting elements may be employed to illuminate the one or more visible light regions of the stylus in order to indicate different notifications, states, operations, properties, actions or behaviors. In one or more implementations, the one or more light-emitting elements are controlled to illuminate the one or more visible light regions of the stylus with colored light corresponding to a current digital ink color of the stylus.

20 Claims, 5 Drawing Sheets

(56) References Cited

U.S. PATENT DOCUMENTS

| | | | | |
|---|---|---|---|---|
| 2009/0146975 A1* | 6/2009 | Chang | ................ | G06F 3/03545 345/179 |
| 2011/0141067 A1* | 6/2011 | Misawa | ................ | G06F 3/0304 345/179 |
| 2011/0310066 A1 | 12/2011 | Fermgard et al. | | |
| 2013/0106796 A1* | 5/2013 | Yilmaz | ................ | G06F 3/0383 345/179 |
| 2014/0049521 A1 | 2/2014 | Gil et al. | | |
| 2014/0085269 A1* | 3/2014 | Armstrong-Muntner | .................... | G02F 1/1333 345/179 |
| 2014/0111488 A1 | 4/2014 | Michihata et al. | | |
| 2014/0133134 A1* | 5/2014 | Kim | ...................... | F21V 23/009 362/109 |
| 2014/0253468 A1* | 9/2014 | Havilio | ............... | G06F 3/03545 345/173 |
| 2016/0048021 A1* | 2/2016 | Border | ............... | G02B 27/0172 345/690 |
| 2016/0048221 A1* | 2/2016 | Boulanger | ............ | G06F 3/0321 345/594 |
| 2017/0083164 A1* | 3/2017 | Sheng | ................... | G06F 3/0433 |
| 2018/0088689 A1* | 3/2018 | Frenock | .............. | G06F 3/03545 |
| 2018/0209818 A1* | 7/2018 | Miyazawa | .............. | G06F 3/038 |

OTHER PUBLICATIONS

"Digital Pen and Paper Solution vCitePlus User's Guide", Published on: Jul. 2009 Available at: http://www.velosum.com/files/vCite User Guide v4.pdf_.

"Operating Instructions Electronic Pen Operations Interactive Plasma Display", Retrieved on: Jul. 22, 2016 Available at: http://panasonic.net/prodisplays/download/pdf/instructions/TH-65PB1U_Pen_English.pdf.

"Adobe Ink & Slide quick start guide", Published on: Aug. 4, 2014 Available at: https://helpx.adobe.com/ink-and-slide/how-to/quick-start-guide.html.

* cited by examiner

STYLUS WITH VISIBLE LIGHT REGIONS

RELATED APPLICATION

This application claims priority to U.S. Provisional Application Ser. No. 62/404,122, filed Oct. 4, 2016, entitled "Stylus with Visible Light Regions" the entire disclosure of which is hereby incorporated by reference herein in its entirety.

BACKGROUND

Functionality that is available from various kinds of computing devices (e.g., mobile devices, game consoles, televisions, set-top boxes, personal computers, etc.) is ever increasing. Additionally, the techniques that may be employed to interact with the computing devices are also developing and adapting. For example, users traditionally interacted with computing devices using keyboards and a mouse. The keyboard was typically used to enter text whereas the mouse was used to control a cursor to navigate through a user interface of the computing device as well as initiate to actions, e.g., launching applications and so on. Additional techniques were subsequently developed, such as through support of a stylus to input digital handwriting, navigate through user interfaces, and so on.

Unlike traditional physical pens, a stylus for a computing device can be controlled to provide different colors of "digital ink". However, it can be difficult for the user to determine the current digital ink color assigned to the stylus. This may cause confusion for the user and result in an inefficient use of the user's time when the user must "re-do" or edit drawing strokes that were made in the wrong color. One solution is to use a set of differently colored styluses where each stylus includes an enclosure or markings indicative of its respective color and a unique ID that can be transmitted to the digitizer to describe the digital ink color. However, this option is expensive as multiple styluses must be utilized.

SUMMARY

Stylus with visible light regions techniques are described herein. In implementations, a stylus for a computing device is configured with one or more light-emitting elements configured to selectively illuminate one or more visible light regions of the stylus. Generally, the light-emitting elements may be employed to illuminate the one or more visible light regions of the stylus in order to indicate different notifications, states, operations, properties, actions or behaviors. In one or more implementations, the one or more light-emitting elements are controlled to illuminate the one or more visible light regions of the stylus with colored light corresponding to a current digital ink color of the stylus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
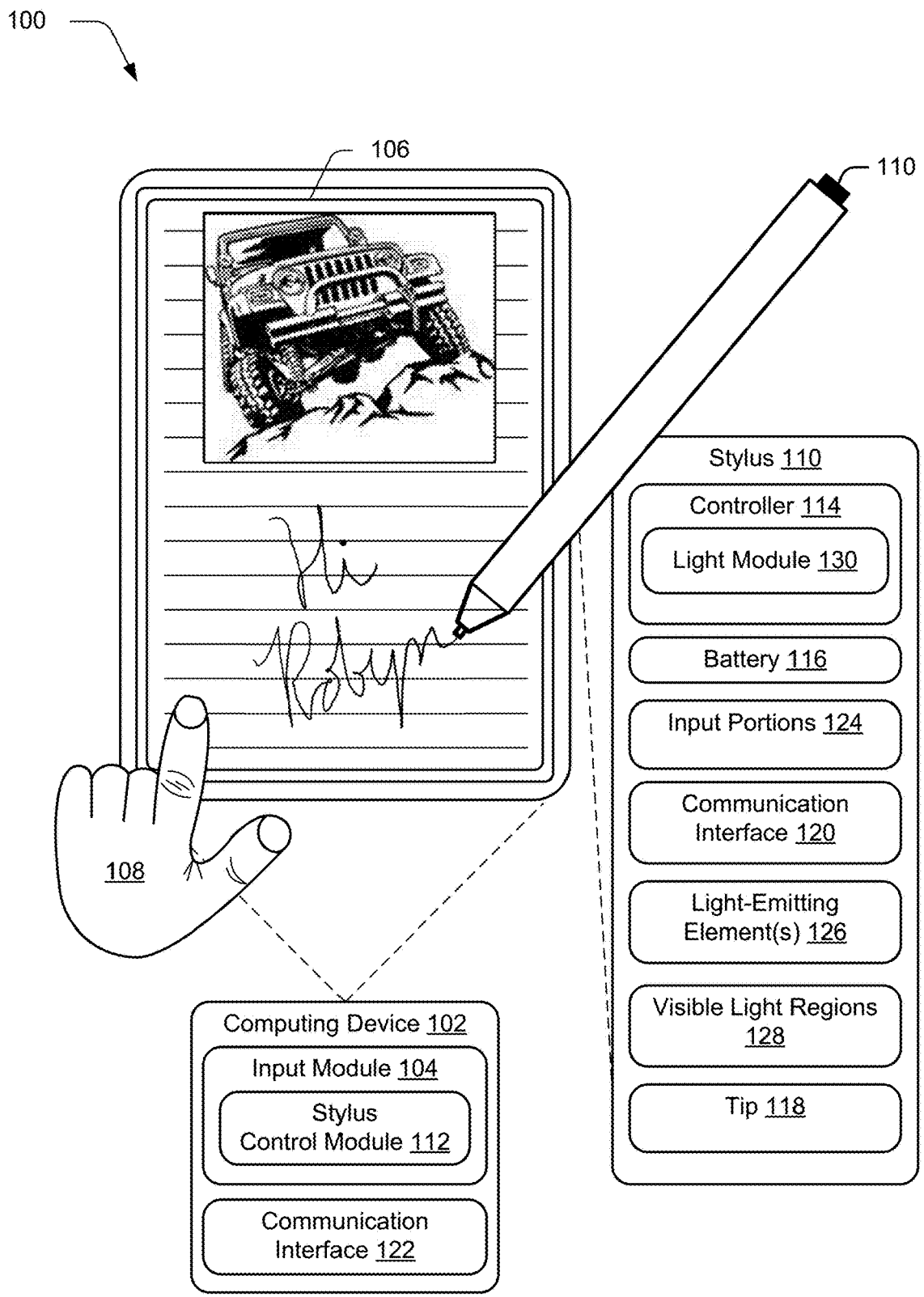
FIG. 1 is an illustration of an environment in an example implementation that is operable to employ stylus with visible light regions techniques.

Stylus with visible light regions techniques are described herein. In implementations, a stylus for a computing device is configured with one or more light-emitting elements configured to selectively illuminate one or more visible light regions of the stylus. Generally, the light-emitting elements may be employed to illuminate the one or more visible light regions of the stylus in order to indicate different notifications, states, operations, properties, actions or behaviors. For example, the light-emitting elements may be controlled to output light to indicate that a button on the stylus has been pressed, to indicate low battery power, to indicate whether the stylus is paired to the computing device, to indicate a firmware update, to indicate that the stylus is powered on, and so forth.

The visible light regions may correspond to a sizeable portion of the stylus, including by way of example and not limitation, one or more of the tip, middle, or tail portion of the stylus. However, it is to be appreciated that any number of different visible light regions, in a variety of different shapes and sizes, may be arranged at a variety of different positions on the stylus.

In one or more implementations, the one or more light-emitting elements are controlled to illuminate the one or more visible light regions of the stylus with colored light corresponding to a current digital ink color of the stylus. Illuminating the visible light regions with colored light corresponding to a current digital ink color of the stylus provides a clear representation to the user of the current digital ink color that is selected, which helps minimize coloring mistakes and the subsequent editing operations which must be performed to fix such mistakes.

In order to decrease the cost of manufacturing the stylus, while also reducing power consumption, a light-emitting element, such as a simple RGB light-emitting diode (LED), may be employed to illuminate one or multiple regions of the stylus by configuring the stylus with an opaque material that allows the emitted light to be visible at the one or more visible light regions. Alternately or additionally, optical fibers may be used to carry light emitted from the light-emitting element throughout the stylus. For example, optical fibers may be integrated along the sides of the stylus to provide colored light, indicative of the current digital ink color, along the entire length of the stylus. The flexibility of optical fiber may be used to form patterns or words within the stylus. For example, the optical fiber can be used to write the user's name, such that the colored light output by the light-emitting elements illuminates the user's name.

In some cases, a communication channel can be established between the stylus and the computing device which enables signals indicative of the current digital ink color to be communicated from the stylus to the computing device, or from the computing device to the stylus. This enables the current digital ink color to be modified via user interaction with computing device (in which case the stylus receives control signals indicative of the current digital ink color from the computing device), or via user interaction with an input portion of the stylus (in which case control signals indicative of the current digital ink color are communicated from the stylus to the computing device).

In the following discussion, an example environment is first described that is operable to employ the techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

FIG. 1 is an illustration of an environment 100 in an example implementation that is operable to employ stylus with visible light regions techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a digitizer panel. The input module 104 may operate to detect a finger of a user's hand 108 as contacting of being within a threshold distance or close proximity (e.g., within two centimeters) to the display device 106 of the computing device 102, recognize and resolve input provided via a stylus 110, and so on. The input may take a variety of different forms, such as to recognize movement of the stylus 110 and/or a finger of the user's hand 108 across the display device 106, pressing and tapping on the digitizer panel, drawing of a line, and so on. In implementations, various inputs may be recognized as gestures.

A variety of different types of gestures may be recognized, such as gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). The differentiation may be performed in a variety of ways, such as by detecting an amount of the display device 106 that is contacted by the finger of the user's hand 108 versus an amount of the display device 106 that is contacted by the stylus 110. Differentiation may also be performed through use of a camera to distinguish a touch input (e.g., holding up one or more fingers) from a stylus input (e.g., holding two fingers together to indicate a point) in a natural user interface (NUI).

Thus, the input module 104 may support a variety of different gesture techniques by recognizing and leveraging a division between stylus and touch inputs. For instance, the input module 104 may be configured to recognize the stylus as a writing tool, whereas touch is employed to manipulate objects displayed by the display device 106. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space involving a plurality of gestures. It should be noted that by differentiating between stylus and touch inputs, the number of gestures that are made possible by each of these inputs alone is also increased. For example, although the movements may be the same, different gestures (or different parameters to analogous commands) may be indicated using touch inputs versus stylus inputs.

The computing device 102 is further illustrated as including a stylus control module 112. The stylus control module 112 is representative of functionality of the computing device relating to operation of the stylus 110 and processing of input obtained via the stylus. For example, the stylus control module 112 may be configured to perform one or more actions responsive to the stylus 110, such as to draw lines as illustrated by the handwritten freeform lines in the display device 106 that illustrate "Hi" and "Robyn." As described herein, ink displayed by display device 106 responsive to user input via stylus 110 is referred to as "digital ink".

Thus, the stylus control module 112 may be further configured to perform a variety of different operations, such as to draw a line using digital ink to mimic a pencil or pen, produce strokes like a paintbrush, and so on. The stylus control module 112 may also recognize the stylus 110 to perform erase operations, such as to mimic a rubber eraser and erase portions of a user interface. Thus, the stylus control module 112 additionally provides interaction via the stylus 110 that is intuitive and natural to a user. Stylus control module 112 further controls the color of the digital ink that is displayed on display device 106 responsive to input from stylus 110. As described in more detail below, the color of the digital ink can be modified based on user interaction with a color interface displayed on display device 106 or via user input to input portions of stylus 110.

As further depicted in FIG. 1, the stylus 110 may include a controller 114. The controller 114 represents logic, hardware, and circuitry of the stylus that implements various functionality associate with the stylus such as to power and control the stylus, establish communication channels, and exchange communications/data with other devices. The controller 114 may be implemented using various processing devices or systems such as an application-specific integrated circuit (ASIC), a general-purpose processor or microcontroller, or a system on chip (SoC) device. To power the controller, circuitry, and other components, the stylus 110 includes a battery 116.

The stylus 110 further includes a tip 118, which is configured to mimic the finger of a user and is recognized as touch input by the digitizer of computing device 102. In some cases, the stylus 110 is passive and thus input from the tip 118 of stylus 110 is handled by the digitizer of computing device 102 just like other touch input. Alternately, stylus 110 may be configured as an active stylus, in which case tip 118 may include a transmitter and/or receiver device operable to communicate signals when tip 118 is touching, or in close proximity to, display device 106 of computing device 102. For example, a transmitter of tip 118 can transmit signals used to facilitate stylus location, pressure indications, and other advanced functions. As will be discussed in more detail below, in some cases the transmitter of tip 118 can communicate a current digital ink color of the stylus 110 to computing device 102. Alternately or additionally, the receiver of tip 118 can receive the current digital ink color of the stylus 110 from the computing device 102.

In one or more implementations, stylus 110 further includes a communication interface 120 that is configured to establish a communication channel (e.g., a Bluetooth communication channel) with computing device 102 via a corresponding communication interface 122 of the computing device 102. For example, communication interfaces 120 and 122 may be implemented as wireless personal area network (WPAN) radios which are compliant with various WPAN standards, such as Bluetooth™ standards, IEEE 802.15 standards, infrared data association (IrDA) standards, wireless USB standards, or simple electrostatic field communication, to name just a few. The communication channel may be bi-directional, such that information can be communicated from stylus 110 to computing device 102, or from computing device 102 to stylus 110. In some cases, data may be communicated from the digitizer of the computing device 102 to the stylus 110 which receives the data via communication interface 120. In one or more implementations, information indicative of a current digital ink color of stylus 110 is communicated over the communication channel either from stylus 110 to computing device 102, or from computing device 102 to stylus 110.

In some cases, stylus 110 may further include one or more input portions 124 that are configured for user input, such as buttons, scroll wheels, sliders, capacitive touch regions, and so forth. The input portions 124 may enable a number of different functions to be initiated, such as powering the stylus 110 on and off, pairing the stylus 110 with a computing device, automatically launching an application on computing device 102, and so forth.

In one or more implementations, input portions 124 may be configured to enable the digital ink color of stylus 110 to be modified. For example, the user may be able to click a particular button on the stylus in order to scroll through and select the current digital ink color for stylus 110. When the digital ink color of stylus 110 is selected via interaction with the one or more input portions 124, information indicative of the current digital ink color can be communicated from stylus 110 to computing device 102, either via the transmitter of tip 118 or via communication interfaces 120 and 122 over the communication channel.

Stylus 110 further includes one or more light-emitting elements 126 that are configured to output light in multiple different colors. Light-emitting elements 126 may be configured as LEDs or other suitable light elements that are configured to output colored light. For example, light-emitting elements 126 may be implemented as one or more RGB LEDs.

In accordance with techniques described herein, light-emitting elements 126 may be employed to illuminate one or more visible light regions 128 positioned on stylus 110, such as by way of example and not limitation, at a tail portion, middle portion, or tip portion of stylus 110. Generally, light-emitting elements 136 may be employed to illuminate one or more regions of the housing of stylus 110 in order to indicate different notifications, states, operations, properties, actions or behaviors. For example, light-emitting elements 136 may be controlled to output light to indicate that a button on the stylus 110 has been pressed, to indicate low battery power, to indicate whether the stylus 110 is paired to the computing device 102, to indicate a firmware update, to indicate that the stylus 110 is powered on, and so forth. As discussed in more detail below, light-emitting elements 136 may also be controlled to represent the current digital ink color of stylus 110.

In some cases, one or more visible light regions 128 are formed from a semi-opaque or transparent material, such as a semi-opaque plastic. The semi-opaque or transparent material enables light output by light-emitting elements 126 to be visible at the one or more visible light regions 128. Thus, light-emitting elements 126 may be positioned within stylus 110 such that light that is output by the light-emitting elements 126 is visible through the semi-opaque or transparent material of the stylus 110.

Alternately or additionally, one or more visible light regions 128 may be formed from optical fibers, or any similar type of fiber, thread, or other material configured to transmit light. An optical fiber is a flexible, transparent fiber made by drawing glass or plastic to a diameter slightly thicker than that of a human hair, and can be utilized to transmit light between two ends of the optical fiber. Thus, light-emitting elements 126 may be positioned to emit light into one end of the optical fiber, such that the light illuminates the entire optical fiber.

In accordance with techniques described herein, controller 114 further includes a light module 130 that is configured to control light-emitting elements 126 to output colored light that corresponds to a current digital ink color of stylus 110. For example, light module 130 may control light-emitting elements 126 to be illuminated in different colors in dependence upon a current digital ink color of stylus 110. For example, if the current digital ink color of stylus 110 is red, then light module 140 controls light-emitting elements 126 to output red light which is indicative of the current digital ink color Consider, for example, FIG. 2 which illustrates generally at 200 an example configuration of a stylus 110 of FIG. 1 that includes multiple visible light regions in accordance with one or more implementations. In this example, stylus 110 is shown as including multiple visible light regions 128 at 202, 204, and 206 which are positioned at a tail region, middle region, and tip region, respectively, of stylus 110. However, it is to be appreciated that the any number of different visible light regions, in a variety of different shapes and sizes, may be arranged in a variety of different positions on stylus 110.

As discussed throughout, visible light regions 202, 204, and 206 are configured to be illuminated with colored light which corresponds to a current digital ink color of the stylus 110. For example, light module 130 can determine the current digital ink color of stylus 110, and control one or more light-emitting elements 126 to illuminate visible light regions 202, 204, and 206 with the current digital ink color. In this way, the user is able to quickly and efficiently identify the current digital ink color of the stylus 110 by glancing at the illuminated visible light regions of the stylus.

Figure 2:
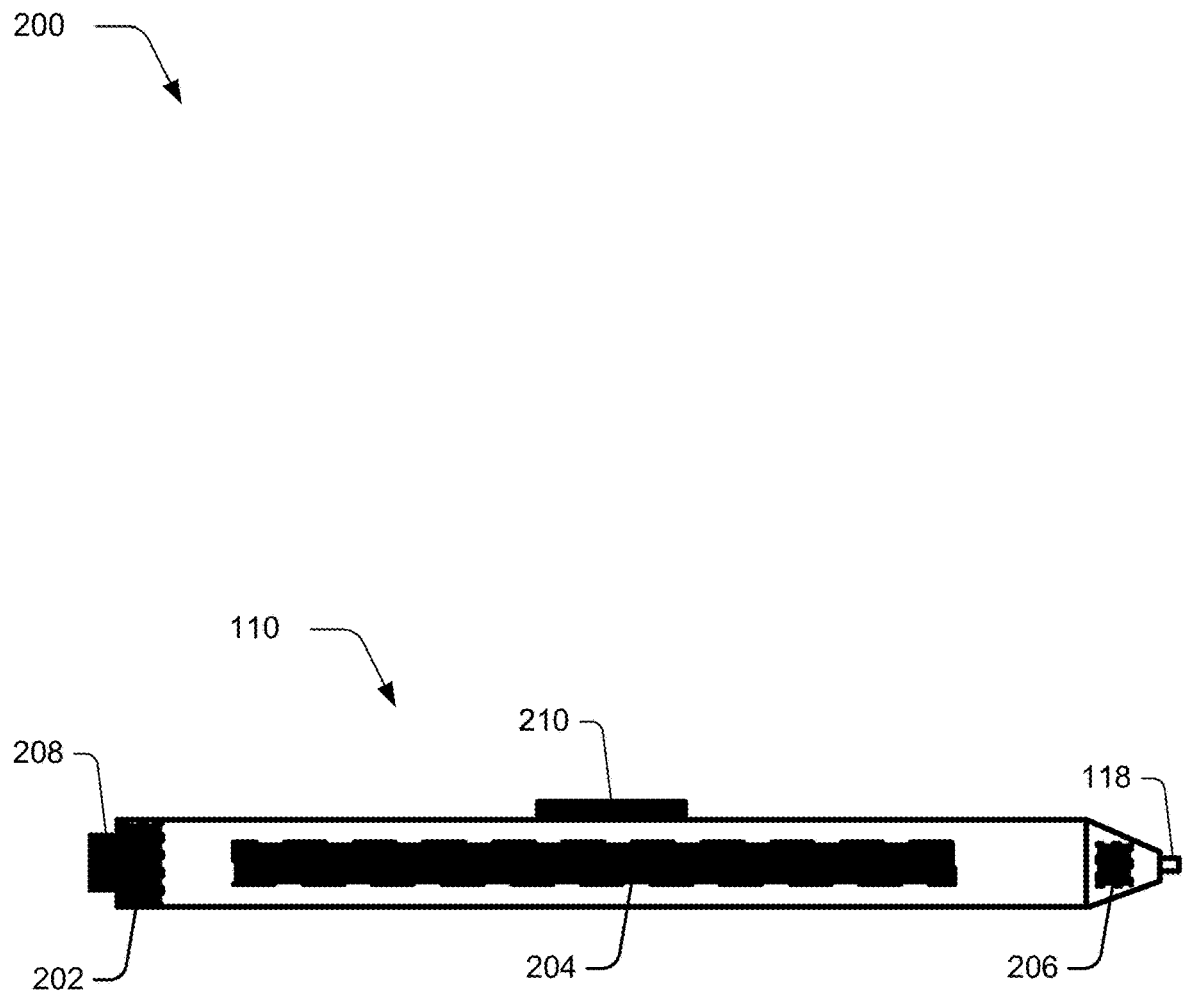
FIG. 2 illustrates an example configuration of the stylus of FIG. 1 that includes multiple visible light regions in accordance with one or more implementations.

As discussed previously, in some cases, one or more of the visible light regions 202, 204, and 206 may be formed from a semi-opaque or transparent material (e.g., a semi-opaque) which enables the light output from the one or more light-emitting elements 126 to be visible through the semi-opaque or transparent material. Alternately or additionally, one or more of the visible light regions 202, 204, or 206 may include one or more optical fibers which are configured to be illuminated with colored light emitted into at least one end of the optical fiber. In some cases, at least one of the visible light regions may be formed from the semi-opaque or transparent material, and at least one other visible light region may be formed from the optical fibers. In FIG. 2, for example, visible light regions 202 and 206, positioned at the tail and tip regions, respectively, may be formed from a semi-opaque plastic, while visible light region 204, positioned at the middle region, may include one or more optical fibers embedded or integrated within the stylus. Naturally, any combination of semi-opaque materials and optical fibers may be utilized by stylus 110 to provide a variety of different configurations or patterns of visible light regions.

In some cases, light module 130 may control multiple light-emitting elements 126 to illuminate multiple visible light regions 128 with different colors concurrently. For example, light module 130 can control a first light-emitting element 126 to output red light to visible light region 202 to indicate a low battery power state, while at the same time controlling a second light-emitting element 126 to output blue light to visible light region 204 to indicate the current digital ink color.

In this example, stylus 110 further includes multiple input portions 124, illustrated as buttons 208 and 210 which are positioned at the tail and middle regions of the stylus 110, respectively. Buttons 208 and 210 are selectable to initiate a variety of different functions. In one or more implementations, buttons 208 and 210 can be configured to enable modification of the current digital ink color. For example, a user could click button 210 to scroll through a list of different colors, such as red, blue, green, yellow, and purple. In this example, each time that the user clicks button 210, the digital ink color of the stylus is changed to the next color in the list (e.g., from green to yellow or from yellow to purple).

In response to a color change initiated via selection of button 210, light module 130 may also change the color of light output by light-emitting elements 126 to cause one or more of visible light regions 202, 204, or 206 to be illuminated with a color that matches the current digital ink color. The current digital ink color may also be transmitted from stylus 110 to computing device 102, in response to the color change input, to enable computing device to control the display device 106 to output digital ink in the correct color. As discussed throughout, signals indicative of the current digital ink color may be transmitted to the computing device 102 via a transmitter of tip 118 or via communication interface 120.

In one or more implementations, a first button of stylus 110 can be utilized to scroll through a list of available digital ink colors, while a second button of stylus 110 can be utilized to confirm and select the digital ink color. For example, the user could click button 210 to scroll from red, to blue, to green. With each click, at least one of the visible light regions may change to a color of the scrolled to digital ink color. For example, when the user clicks button 210 to scroll from red to blue, the visible light region 204 may change from being illuminated with red light to blue light. At this point of time, however, information indicative of the blue color change is not communicated to the computing device 102. Thus, if the user takes no further action, the color of the digital ink is not changed. However, the user can click button 208 in order to confirm the selection of blue as the new digital ink color, at which time signals indicative of the blue color change are communicated from stylus 110 to computing device 102 via the transmitter of tip 118 or communication interface 120.

Figure 3:
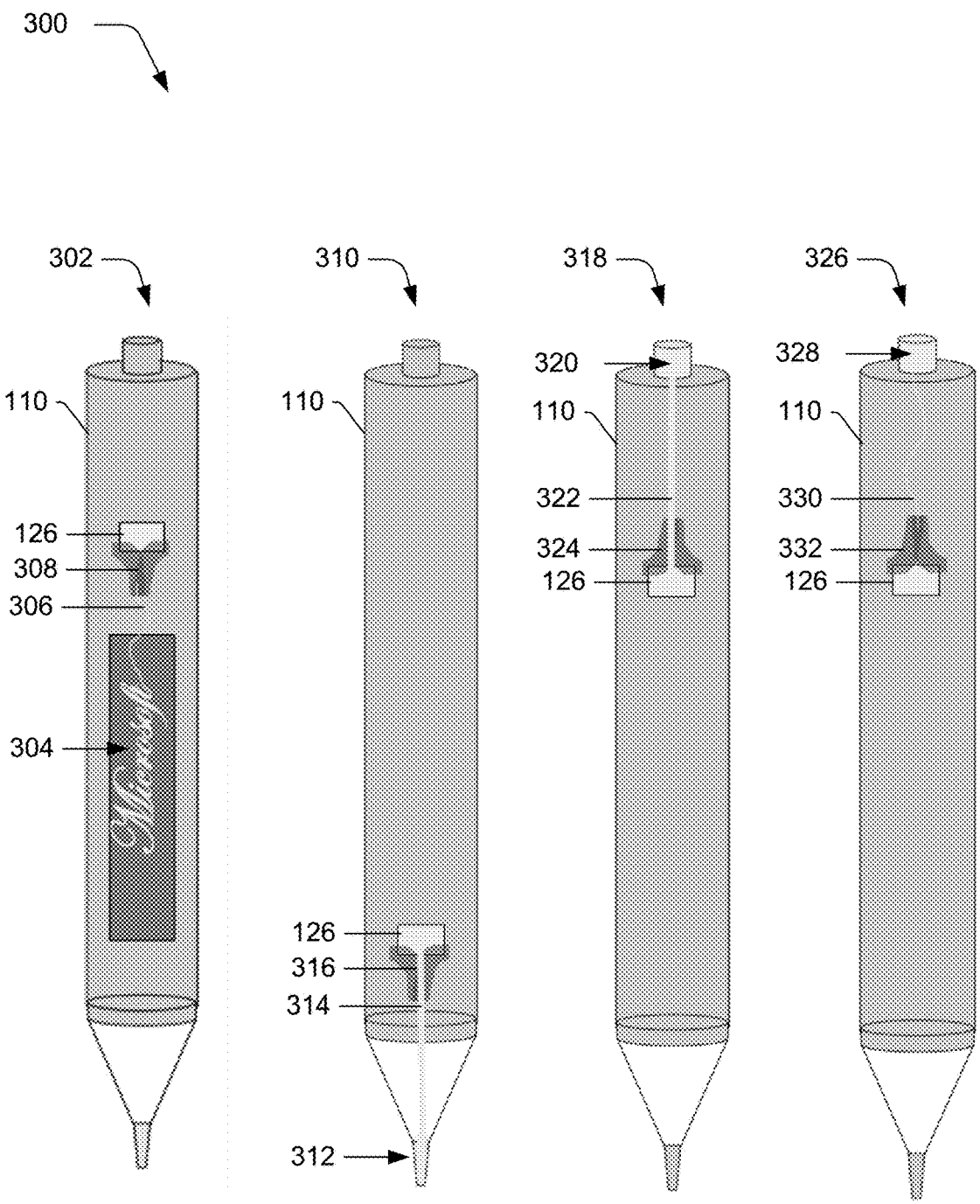
FIG. 3 which illustrates additional example configurations of the stylus of FIG. 1 with visible light regions.

FIG. 3 illustrates generally at 300 additional example configurations of a stylus 110 of FIG. 1 with visible light regions. At 302, stylus 110 is shown with a visible light region 304, which in this example is positioned in a middle region of stylus 110. A light-emitting element 126 is positioned within the housing of stylus 110, and can be controlled to output light to visible light region 304, as described throughout.

In this example, light-emitting element 126 is controlled to emit light into a first end of an optical fiber 306 such that light illuminates the entire optical fiber 306. A light-focusing component 308 is also shown in this example, and is configured to focus the light from the light-emitting element 126 into the optical fiber 306. The light-focusing component 308 may be implemented in a variety of different ways, such as a light guide or wave guide, a prism, and so forth.

The flexibility of optical fiber may be used to form patterns or words within the stylus. In this example, the optical fiber is used to write the word "Microsoft," such that the light output by the light-emitting element 126 illuminates the word "Microsoft." As discussed throughout, the light source can be controlled to emit colored light, which can be indicative of the current digital ink color, to indicate a notification or operation, and so forth.

As another example, at 310, stylus 110 is shown with a visible light region 312, which in this example is positioned in a tip region of stylus 110. A light-emitting element 126 is positioned within the housing of stylus 110, and can be controlled to output light to visible light region 312, as described throughout.

In this example, light-emitting element 126 is controlled to emit light into a first end of a light guide 314, which carries the light to the visible light region 312 in the tip region of stylus 110. A light-focusing component 316 is also shown in this example, and is configured to focus the light from the light-emitting element 126 into the light guide 314. As discussed throughout, the light-emitting element 126 can be controlled to emit colored light, which can be indicative of the current digital ink color, to indicate a notification or operation, and so forth.

As another example, at 318, stylus 110 is shown with a visible light region 320, which in this example is positioned in a tail region of stylus 110, which corresponds to a selectable button. A light-emitting element 126 is positioned within the housing of stylus 110, and can be controlled to output light to visible light region 320, as described throughout.

In this example, light-emitting element 126 is controlled to emit light into a first end of a light guide 322, which carries the light to the visible light region 320 in the tail region of stylus 110. A light-focusing component 324 is also shown in this example, and is configured to focus the light from the light-emitting element 126 into the light guide 322. As discussed throughout, the light-emitting element 126 can be controlled to emit colored light, which can be indicative of the current digital ink color, to indicate a notification or operation, and so forth.

As another example, at 326, stylus 110 is shown with a visible light region 328, which in this example is positioned in a tail region of stylus 110, which corresponds to a selectable button. A light-emitting element 126 is positioned within the housing of stylus 110, and can be controlled to output light to visible light region 328, as described throughout.

In this example, light-emitting element 126 is controlled to emit light into a first end of an optical fiber 330, which carries the light to the visible light region 328 in the tail region of stylus 110. A light-focusing component 332 is also shown in this example, and is configured to focus the light from the light-emitting element 126 into the optical fiber 330. As discussed throughout, the light-emitting element 126 can be controlled to emit colored light, which can be indicative of the current digital ink color, to indicate a notification or operation, and so forth.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 4:
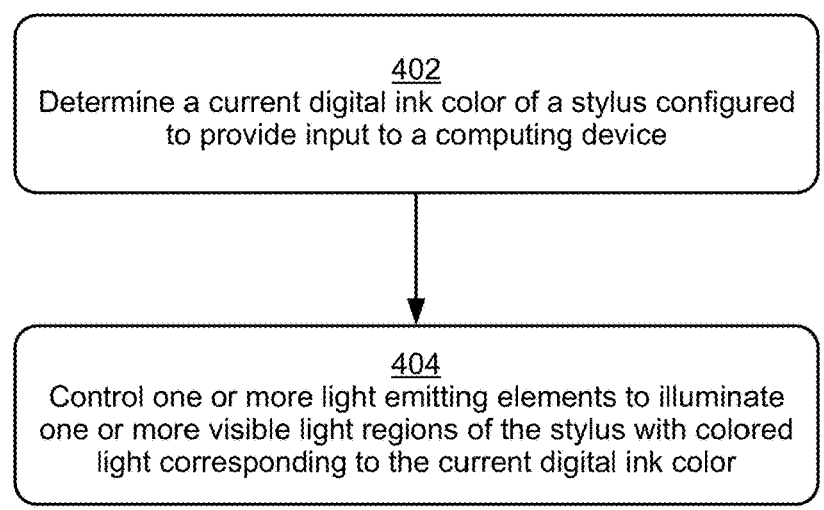
FIG. 4 is a flow diagram depicting an example procedure which light-emitting elements are employed to selectively illuminate one or more visible light regions of a stylus in order to indicate a current digital ink color of the stylus in accordance with one or more implementations.

FIG. 4 is a flow diagram depicting an example procedure 300 in which light-emitting elements are employed to selectively illuminate one or more visible light regions of a stylus in order to indicate a current digital ink color of the stylus in accordance with one or more implementations.

At 402, a current digital ink color of a stylus is determined. For example, controller 114 of stylus 110 determines a current digital ink color of stylus 110. As described throughout, the current digital ink color corresponds to a color output on a display device 106 of computing device 102 when the tip 118 of stylus 110 contacts the display device 106 (or comes within close proximity to display device 106), such as to write, draw, and so forth.

As discussed previously the current digital ink color of the stylus 110 can be selected and determined in a variety of different ways. In one or more implementations, the current digital ink color is selected via user interaction with an application (e.g., a paint or drawing application) executing on computing device 102. For example, a paint color could be selected from a color wheel, or similar type of interface, displayed on the display device 106 of computing device 102, such as by the user selecting the color with stylus 110, their finger, a mouse, and so forth. In this case, responsive to the selection, computing device 102 communicates the current digital ink color to stylus 110 via communication interface 122. Alternately, the ink color can be communicated from computing device 102 to stylus 110 via the receiver of tip 118.

Alternately, the current digital ink color can be selected via user interaction with one or more input portions 124 of stylus 110. For example, as discussed previously, the user may select input portion 124, such as by pressing, scrolling, and so forth, in order to change the current digital ink color of stylus 110. In this case, the current digital ink color is communicated from stylus 110 to computing device 102, such that when the stylus 110 contacts display device 106 of computing device 102 (or comes within close proximity to display device 106), the writing or drawing strokes are output for display in the current digital ink color. In some cases, the current digital ink color is communicated from stylus 110 via communication interfaces 120 and 122 (e.g., via a Bluetooth connection). Alternately, the current digital ink color can be communicated from the transmitted of tip 118 to computing device 102 when tip 118 is touching, or within close proximity to, display device 106 of computing device 102.

At 404, one or more light-emitting elements are controlled to illuminate one or more visible light regions of the stylus with colored light corresponding to the current digital ink color. For example, light module 130 controls one or more light-emitting elements 126 to illuminate one or more visible light regions 128 with colored light corresponding to the current digital ink color. In some cases, the colored light is output to the one or more visible light regions 128 via a transparent material, such as a semi-opaque plastic. Alternately or additionally, the colored light is output to the one or more visible light regions 128 via an optical fiber or similar material.

Having considered the foregoing example environment, devices and techniques, consider not a discussion of an example system that may be utilized to implement various aspects in accordance with one or more implementations.

Figure 5:
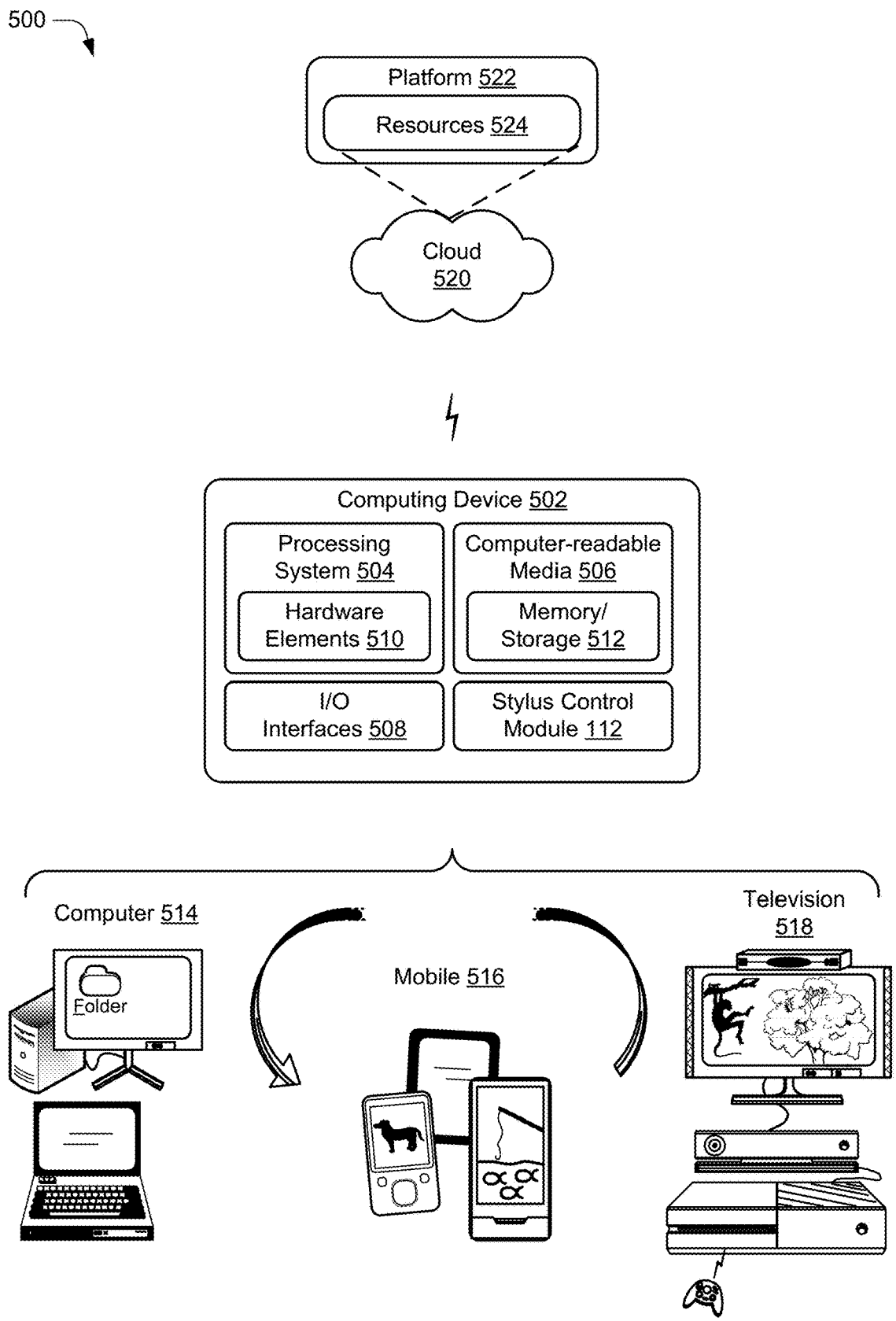
FIG. 5 illustrates an example system that includes an example computing device that is representative of one or more computing systems and/or devices that may implement the various techniques described herein.

FIG. 5 illustrates an example system 500 that includes an example computing device 1002 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a stylus, a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method and/or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the input module 104, stylus control module 112 and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the stylus control module 112 with the computing device 502. The functionality represented by the stylus control module 112 and other modules/applications may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device example, implementation of functionality described herein may be distributed throughout the system 500. For example, the functionality may be implemented in part on the computing device 502 as well as via the platform 522 that abstracts the functionality of the cloud 520.

Example implementations described herein include, but are not limited to, one or any combinations of one or more of the following examples:

In one or more examples, a stylus for a computing device comprises: one or more light-emitting elements configured to selectively illuminate one or more visible light regions of the stylus; a controller configured to determine a current digital ink color of the stylus; and a light module configured to control the one or more light-emitting elements to illuminate one or more visible light regions of the stylus with colored light corresponding to the current digital ink color.

An example as described alone or in combination with any of the other examples described above or below, wherein at least one of the one or more visible light regions comprises a semi-opaque material enabling the colored light output by the one or more light-emitting elements to be visible.

An example as described alone or in combination with any of the other examples described above or below, wherein at least one of the one or more visible light regions comprises one or more optical fibers integrated into the stylus and configured to receive the colored light from at least one light-emitting element and output the colored light such that the colored light is visible.

An example as described alone or in combination with any of the other examples described above or below, wherein the one or more visible light regions comprise a tip portion, a middle portion, or a tail portion of the stylus.

An example as described alone or in combination with any of the other examples described above or below, wherein the controller is configured to determine the current digital ink color based on user input to one or more input portions of the stylus that are selectable to change the digital ink color.

An example as described alone or in combination with any of the other examples described above or below, wherein the controller is further configured to communicate signals indicative of the current digital ink color to the computing device in response to receiving user input to the one or more input portion of the stylus to change the digital ink color.

An example as described alone or in combination with any of the other examples described above or below, wherein the controller communicates the signals indicative of the current digital ink color to the computing device via a communication channel established between the stylus and the computing device.

An example as described alone or in combination with any of the other examples described above or below, wherein the controller communicates the signals indicative of the current digital ink color to the computing device via a transmitter of a tip of the stylus when the tip is located within a close proximity to a display device of the computing device.

An example as described alone or in combination with any of the other examples described above or below, wherein the controller is configured to determine the current digital ink color based on signals indicative of the current digital ink color received from the computing device.

An example as described alone or in combination with any of the other examples described above or below, wherein the controller receives the signals indicative of the current digital ink color from the computing device via a communication channel established between the stylus and the computing device.

An example as described alone or in combination with any of the other examples described above or below, wherein the controller receives the signals indicative of the current digital ink color from the computing device via a receiver of a tip of the stylus when the tip moves within a close proximity to a display device of the computing device.

An example as described alone or in combination with any of the other examples described above or below, wherein the controller is further configured to control the one or more light-emitting elements to illuminate the one or more visible light regions of the stylus with colored light in order to indicate one or more different notifications, states, operations, properties, actions, or behaviors.

An example as described alone or in combination with any of the other examples described above or below, wherein the one or more light-emitting elements each comprise an RGB light-emitting diode.

In one or more examples, a computer-implemented method comprises: determining a current digital ink color of a stylus configured to provide input to a computing device; and controlling one or more light-emitting elements to illuminate one or more visible light regions of the stylus with colored light corresponding to the current digital ink color.

An example as described alone or in combination with any of the other examples described above or below, wherein the determining comprises determining the current digital ink color based on user input to one or more input portions of the stylus that are selectable to change the digital ink color.

An example as described alone or in combination with any of the other examples described above or below, further comprising communicating signals indicative of the current digital ink color to the computing device in response to receiving the user input to the one or more input portion of the stylus to change the digital ink color.

An example as described alone or in combination with any of the other examples described above or below, wherein the signals indicative of the current digital ink color are communicated to the computing device via a communication channel established between the stylus and the computing device.

An example as described alone or in combination with any of the other examples described above or below, wherein the signals indicative of the current digital ink color are communicated to the computing device via a transmitter of a tip of the stylus when the tip is located within a close proximity to a display device of the computing device.

An example as described alone or in combination with any of the other examples described above or below, wherein the determining comprises determining the current digital ink color based on signals indicative of the current digital ink color received from the computing device.

An example as described alone or in combination with any of the other examples described above or below, wherein the signals indicative of the current digital ink color are received from the computing device via a communication channel established between the stylus and the computing device, or via a receiver of a tip of the stylus when the tip moves within a close proximity to a display device of the computing device.

In one or more examples, a stylus for a computing device comprises: one or more light-emitting elements configured to selectively illuminate one or more visible light regions of the stylus; and a light module configured to control the one or more light-emitting elements to illuminate the one or more visible light regions of the stylus with colored light in order to provide an indication of one or more notifications, states, operations, properties, actions, or behaviors of the stylus.

An example as described alone or in combination with any of the other examples described above or below, wherein the light module controls the one or more light-emitting elements to provide the indication in response to user input to one or more input portions of the stylus.

An example as described alone or in combination with any of the other examples described above or below, wherein the light module controls the one or more light-emitting elements to provide the indication in response to signals received from the computing device.

An example as described alone or in combination with any of the other examples described above or below, wherein the signals are received from the computing device via a communication channel established between the stylus and the computing device.

An example as described alone or in combination with any of the other examples described above or below, wherein the signals are received from the computing device via a receiver of a tip of the stylus when the tip moves within a close proximity to a display device of the computing device.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:
1. A stylus for a computing device comprising:
   one or more light-emitting elements configured to selectively illuminate one or more visible light regions of the stylus;
   one or more flexible optical fibers illuminated by one or more of the light-emitting elements, wherein flexibility of the one or more flexible optical fibers configures the one or more flexible optical fibers to form patterns that are visible though one or more of the visible light regions of the stylus;
   a controller configured to determine a current digital ink color of the stylus; and
   a light module configured to control the one or more light-emitting elements to illuminate one or more of the visible light regions of the stylus with colored light corresponding to the current digital ink color.

2. The stylus of claim 1, wherein the flexibility of at least one of the one or more flexible optical fibers configures the at least of the one or more flexible optical fibers to form at least one word that is visible through the one or more of the visible light regions of the stylus.

3. The stylus of claim 1, wherein the one or more light regions comprises at least one of a tip portion, a middle portion, or a tail portion of the stylus.

4. The stylus of claim 1, wherein the controller is configured to determine the current digital ink color based on user input to one or more input portions of the stylus that are selectable to change the digital ink color.

5. The stylus of claim 1, wherein the controller communicates the signals indicative of the current digital ink color to the computing device via a communication channel established between the stylus and the computing device.

6. The stylus of claim 1, wherein the controller is configured to determine the current digital ink color based on signals indicative of the current digital ink color received from the computing device.

7. The stylus of claim 6, wherein the controller receives the signals indicative of the current digital ink color from the computing device via a communication channel established between the stylus and the computing device.

8. The stylus of claim 6, wherein the controller receives the signals indicative of the current digital ink color from the computing device via a receiver of a tip of the stylus when the tip moves within a close proximity to a display device of the computing device.

9. A computer-implemented method comprising:
determining a current digital ink color of a stylus configured to provide input to a computing device;
modifying the current digital ink color of the stylus based on user input;
controlling one or more light-emitting elements to illuminate one or more flexible optical fibers, wherein flexibility of the one or more flexible optical fibers configures the one or more flexible optical fibers to form at least one word that is visible though one or more light regions of the stylus with colored light corresponding to the current digital ink color.

10. The computer-implemented method of claim 9, wherein the determining comprises determining the current digital ink color based on user input to one or more input portions of the stylus that are selectable to change the digital ink color.

11. The computer-implemented method of claim 9, wherein the determining comprises determining the current digital ink color based on signals indicative of the current digital ink color received from the computing device.

12. The computer-implemented method of claim 11, wherein the signals indicative of the current digital ink color are received from the computing device via a communication channel established between the stylus and the computing device, or via a receiver of a tip of the stylus when the tip moves within a close proximity to a display device of the computing device.

13. A stylus for a computing device comprising:
one or more light-emitting elements configured to selectively illuminate one or more visible light regions of the stylus;
one or more flexible optical fibers illuminated by one or more of the light-emitting elements, wherein flexibility of the one or more flexible optical fibers configures the one or more flexible optical fibers to forms patterns or words that are visible though one or more of the visible light regions;
and
a light module configured to control the one or more light-emitting elements to illuminate the one or more visible light regions of the stylus with colored light in order to provide an indication of one or more notifications, states, operations, properties, actions, or behaviors of the stylus.

14. The stylus of claim 13, wherein the light module controls the one or more light-emitting elements to provide the indication in response to user input to one or more input portions of the stylus.

15. The stylus of claim 13, wherein the light module controls the one or more light-emitting elements to provide the indication in response to signals received from the computing device.

16. The stylus of claim 15, wherein the signals are received from the computing device via a communication channel established between the stylus and the computing device.

17. The stylus of claim 15, wherein the signals are received from the computing device via a receiver of a tip of the stylus when the tip moves within a close proximity to a display device of the computing device.

18. The stylus of claim 13, wherein at least one of the one or more visible light regions comprises one or more optical fibers integrated into the stylus and configured to receive the colored light from at least one light-emitting element and output the colored light such that the colored light is visible.

19. The stylus of claim 1 further comprising:
a light focuser configured to focus light from one or more of the light-emitting elements into the one or more flexible optical fibers.

20. The stylus of claim 19 further comprising:
a second light focuser; and
a light guide, the second light focuser configured to focus second light from another of the one or more of the light-emitting elements into the light guide, the light guide configured to carry the second light through the light guide to a second one of the one or more of the visible light regions of the stylus.

* * * * *